Patented Sept. 15, 1942

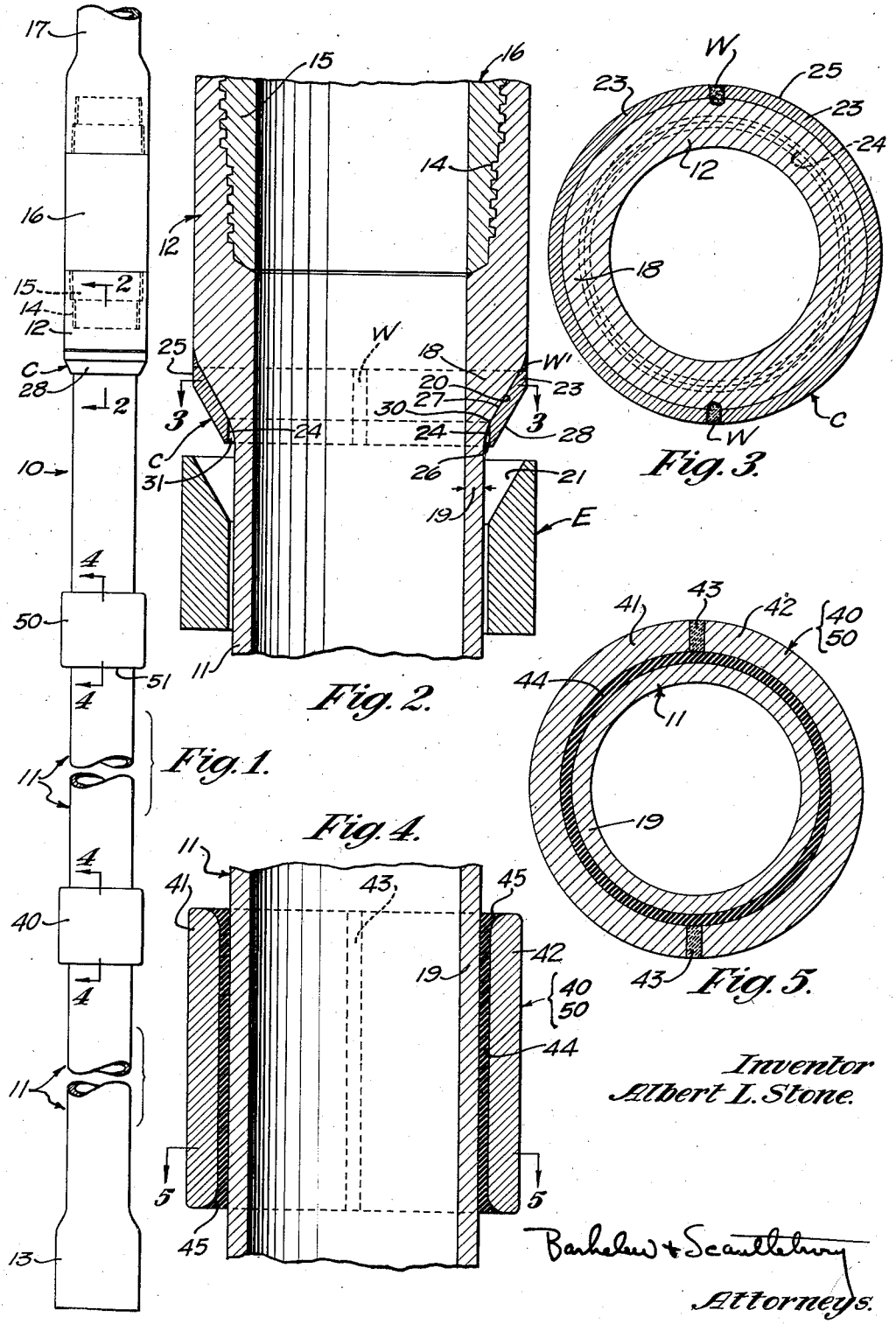

2,295,873

UNITED STATES PATENT OFFICE 2,295,873

WELL PIPE COLLAR

Albert L. Stone, Palos Verdes Estates, Calif., assignor to Hydril Company of California, Los Angeles, Calif., a corporation of California Application September 25, 1939, Serial No. 296,451

4 Claims. (Cl. 255—28)

This invention has to do generally with well pipe collars, and is more particularly concerned with metallic pipe collars which are applied for purposes of providing elevator shoulders or for protecting or stiffening the pipe, proper, though not limited to these particular uses.

It is old, of course, to provide rubber protective collars to well pipe, and their function and method of application are well known. Obviously, however, rubber collars are inherently unable to take certain loads and wear imposed upon elements whose functions are to transfer the pipe load to elevators or to stiffen relatively long sections of pipe.

On the other hand, while metallic collars are well adapted to take the strains and wear imposed on such elements, their method of attachment to the pipe is ordinarily such that they are very apt to set up new stresses and strains in the pipe, and thus, by creating new hazards, offset what advantage they might otherwise contribute.

These new stresses and strains are set up by reason of the tight, terminal fitting of the collar with the pipe. This point of fit, particularly if backed up by any appreciable amount of collar stock extending radially therebehind, becomes a fulcrum point about which the pipe tends to bend when exposed to certain service conditions. The strains are thus concentrated or more or less localized at this point, with the result that pipe failures occur with greater frequency in this zone than in almost any other.

It is therefore a general object of the invention to provide metallic collars, which are best adapted to take wear and certain working strains, and yet fashion and apply them in a manner which will obviate the above described hazardous conditions. How this is done may be set forth to better advantage in connection with the following detailed description, reference being had to the accompanying drawing, in which:

Fig. 1 is an elevation of a drill pipe equipped with a number of collars in accordance with my invention;

Fig. 2 is an enlarged, fragmentary section on line 2—2 of Fig. 1, but showing additionally, in conventional form, a pipe elevator applied to the pipe below the collar;

Fig. 3 is a section on line 3—3 of Fig. 2;

Fig. 4 is an enlarged section on either of the lines 4—4 in Fig. 1; and

Fig. 5 is a section on line 5—5 of Fig. 4.

As a matter of convenience, I have shown several embodiments of my invention on a single length of drill pipe and I have shown this pipe as being of a particular type. However, this consolidation in the showing and the choice of a particular type of pipe, are not to be considered as in any way limitative on the invention. One embodiment of the invention is applicable with particular advantage to the externally upset drill pipe illustrated, and certain of my claims are drawn to this particular combination, but this is not to be construed as limitative on others of the claims.

Drill pipe 10 is made up of body section 11 and externally upset box portions 12 and 13 which are internally threaded at 14 to take the pin 15 of tool joint 16 whereby length 11 is detachably coupled to an adjacent length, such as 17. It will be seen that the wall 18 of the upset where it joins the normal-diameter portion of pipe 11, is appreciably thicker than the normal thickness 19 of the pipe and that a downwardly facing conical shoulder 20 is presented at the lower end of the upset.

Shoulder 20 is normally utilized as an "evelator shoulder"; that is, a pipe-handling elevator such as is conventionally illustrated at E, is adapted to be latched about pipe 11 and moved upwardly to bring its upwardly facing, conical shoulder 21 into engagement with shoulder 20 and then to take the load of the pipe. Shoulders 20 and 21 are substantially complementary.

Shoulder 20 is thus exposed to a great deal of battering and wear, with the result that, unless it be reconditioned, it soon becomes unsafe to depend upon it for elevator-taking purposes. And, of course, if the upset shoulder becomes useless, it may be necessary to discard the entire length of expensive pipe, for pipe and upset are integral.

My invention may be utilized to advantage in reconditioning such shoulders or in providing extra wear-stock on original shoulders. In the latter connection, upsets are now of a length approaching the maximum, that is, within the limits of economic manufacture, and therefore it is impracticable to provide longer integral upsets for supplying the extra wear-stock.

For such purposes I provide a collar C made of a superior wear-resistant stock such as high manganese steel, preferably made up in arcuate sections 23, here shown as two in number, though this is not limitative. The collar, when the sections are assembled in the manner to be described, have inner and outer cylindric peripheral surfaces 24 and 25, respectively, surface 24 defining the bore 26 of the collar. The upper and lower faces 27 and 28 are conical and substantially parallel, face 27 being substantially complementary to shoulder 20. The diameter of the collar bore 26 is greater than the outside diameter of pipe 11 below upset 12 and the vertical extents of surfaces 24 and 25 are such that, when the collar is applied against shoulder 20, as illustrated, face 28 lies, in the main, horizontally opposite face 27 and hence shoulder 20. The collar is applied by fitting the sections 23 about pipe 11 immediately beneath shoulder 20 and weld-integrating the section ends to one another and to the upset, as illustrated at W in Fig. 3. The weld from collar to upset may also be continued around the upper end of the collar, as at W'.

Lower face 28 now becomes the "elevator shoulder" for the pipe length, taking all the wear and loads originally imposed on shoulder 20. It will be noted that the edge 30 of the collar is in contact with shoulder 20 and thus lies in a horizontal plane above the junction of the upset with the normal-diameter portion of the pipe. With annular clearance 31 existing between bore-wall 24 and the outer periphery of pipe 11—that is, with the pipe and collar out of metal-to-metal peripheral contact at the lower end of the collar, the pipe may move radially or bend with respect to the collar at this point, and the collar does not have the usual effect of forming a "fulcrum" point at its lower end where opposed to the relatively thin wall 19, which fulcrum effect would otherwise localize the bending strains at the plane of collar-and-pipe contact and soon lead to failure. Point 30, where collar-edge contact with the pipe does exist, lies on the upset, which is sufficiently strong effectively to resist concentrated bending strains.

With the described relationship existing between faces 27 and 28, when elevator E is applied to collar C, the resultant forces are in a direction tending to hug the collar about the pipe, rather than in a direction tending to split the collar by driving it upwardly over the conical shoulder 20.

Another embodiment of my invention is illustrated by metal collar 40. This collar also may be of material such as high manganese steel and may be sectional in character, with the sections 41 and 42 welded together at 43 after they have been arranged in pipe-encircling position. The bore of the collar is of greater diameter than the pipe and interposed in the space between pipe and collar is a ring 44 of rubber or other suitable resilient material. This rubber is introduced to the annular space between collar and pipe in any desired manner or may be applied to the outside of the pipe or inside of the ring sections before said sections have been assembled and welded. The rubber is then bonded to both the pipe and collar, the rubber thus serving to secure the collar to the pipe. The bonding may be accomplished in any suitable manner, as, for instance, by cementing, but preferably I accomplish it by the known method of vulcanization bonding.

Rubber 44 allows limited relative resilient movement between pipe and collar, and keeps the collar and pipe out of metal-to-metal peripheral contact throughout their coextension. Thus collar 40 may be applied intermediate the ends of a pipe section of such length as to render it relatively "limber," to stiffen the pipe against undue bending and yet, due to the capacity for limited relative resilient movement between collar and pipe and the absence of "fulcrum" effect, as defined above, this stiffening is accomplished without an otherwise coincident localization of bending strains and the creation of hazardous fracture planes. The ends of the collar bore may be flared as at 45, to further reduce the likelihood of terminal "fulcrum" effect.

Collar 40 may also be applied at any point where undue peripheral wear on the pipe is apt to occur. For instance, in individual strands of pipe there are apt to be points where, by reason of bend, one side of the pipe will scrape on the well or casing wall and thus tend to wear through. With collars similar to 40 applied at such points, the wear is taken by the collars, which thus act as protectors for the relatively thin-walled pipe and yet, by reason of the described method of application, they do not set up strains usual to rigid-collar protectors.

At 50 I have shown a collar similar to collar 40 in all respects and applied in the same manner. However, it is located just a little below upset 12 (so it will not interfere with the application of elevator E to shoulders 20 or 28, as the case may be) its lower end face 51 providing a square-cut annular shoulder for receiving the supporting shoulder of a standard elevator such as used in connection with drill strings fitted with A. P. I. tool joints. As illustrated, the spacing between upset 12 and collar 50 is at least greater than the length of the collar diameter.

It will be evident from the above that the invention may be advantageously applied to any collar-to-pipe installation where points of metal-to-metal contact between pipe and collar tend to create fracture planes by reason of the "fulcrum" effect defined above.

While I have described preferred embodiments of my invention, it will be understood various changes in design, structure and arrangement may be made without departing from the spirit and scope of my invention.

I claim:

1. In combination with a metal well pipe having an external, annular upset presenting a downward and inwardly tapering conical shoulder, a wear-resistant metal collar encircling the pipe below the shoulder and having an upwardly and outwardly flaring upper bore portion and a lower, cylindric bore portion, the defining wall of the upper bore portion representing an upper face of the collar, the upper and lower faces of the collar being substantially parallel and the upper face being complementary to and in engagement with said conical shoulder, means securing said collar to said upset, the collar, at the junction of its two bore portions, engaging the upset at a point axially removed from the junction of the upset and the pipe, proper; and the cylindric portion of the collar bore to the extreme lower end of the collar being out of metal-to-metal contact with the pipe-periphery.

2. In combination with a metal well pipe having an external, annular upset presenting a downward and inwardly tapering conical shoulder, a wear-resistant metal collar encircling the pipe below the shoulder and having an upwardly and outwardly flaring upper bore portion and a lower, cylindric bore portion, the defining wall of the upper bore portion representing an upper face of the collar, the upper and lower faces of the collar being substantially parallel and the upper face being complementary to and in engagement with said conical shoulder, means securing said collar to said upset, the collar, at the junction of its two bore portions, engaging the upset at a point axially removed from the junction of the upset and the pipe, proper; and the cylindric portion of the collar bore to the extreme lower end of the collar being out of metal-to-metal contact with the pipe-periphery and a portion, at least, of the lower face of the collar lying horizontally opposite said conical shoulder.

3. In combination with a metal well pipe having an external, annular upset presenting a downward and inwardly tapering conical shoulder, a wear-resistant metal collar encircling the pipe below the shoulder and having an upwardly and outwardly flaring upper bore portion and a lower, cylindric bore portion, the defining wall of the upper bore portion representing an upper face of the collar, the upper and lower faces of the collar being substantially parallel and the upper face being complementary to and in engagement with said conical shoulder, means securing said collar to said upset, the collar, at the junction of its two bore portions, engaging the upset at a point axially removed from the junction of the upset and the pipe, proper; and the cylindric portion of the collar bore to the extreme lower end of the collar being out of metal-to-metal contact with the pipe-periphery and a major portion of the lower face of the collar lying horizontally opposite said conical shoulder.

4. In combination with a vertically extending metal well pipe having an external, annular upset presenting a downwardly facing shoulder, a wear-resistant metal collar encircling the pipe about the shoulder and extending therebelow, the collar being bonded at its upper end with said upset, the collar, from a point near its upper end, being in tight peripheral engagement with the pipe throughout the major portion of the vertical extent of the collar, and the pipe and the lowermost end of the collar being out of metal-to-metal peripheral contact.

ALBERT L. STONE.